(12) United States Patent
Mishima et al.

(10) Patent No.: US 10,895,211 B2
(45) Date of Patent: Jan. 19, 2021

(54) DEVICE, PROGRAM, RECORDING MEDIUM, AND METHOD FOR DETERMINING DEVICE NORMALITY AND ABNORMALITY INVOLVING LOADS

(71) Applicant: NIPPON YUSEN KABUSHIKI KAISHA, Tokyo (JP)

(72) Inventors: Takashi Mishima, Tokyo (JP); Kanefumi Uematsu, Tokyo (JP); Masahiro Shibaoka, Tokyo (JP); Hiroshi Nakatani, Tokyo (JP); Tomoo Oishi, Tokyo (JP); Masayuki Kozuka, Tokyo (JP)

(73) Assignee: Nippon Yusen Kabushiki Kaisha, Tokyo (JP)

( * ) Notice: Subject to any disclaimer, the term of this patent is extended or adjusted under 35 U.S.C. 154(b) by 703 days.

(21) Appl. No.: 15/539,455

(22) PCT Filed: Dec. 26, 2014

(86) PCT No.: PCT/JP2014/084567
§ 371 (c)(1),
(2) Date: Nov. 16, 2017

(87) PCT Pub. No.: WO2016/103463
PCT Pub. Date: Jun. 30, 2016

(65) Prior Publication Data
US 2018/0066596 A1 Mar. 8, 2018

(51) Int. Cl.
*F02D 41/14* (2006.01)
*G06Q 50/28* (2012.01)
(Continued)

(52) U.S. Cl.
CPC ......... *F02D 41/1446* (2013.01); *B63H 21/21* (2013.01); *F02D 29/02* (2013.01);
(Continued)

(58) Field of Classification Search
CPC ............... B63H 21/21; G05D 2201/00; G05D 2201/02; G05D 2201/0201;
(Continued)

(56) References Cited

U.S. PATENT DOCUMENTS

2003/0056497 A1  3/2003  Kuenstler et al.

FOREIGN PATENT DOCUMENTS

| JP | H04008809 A | 1/1992 |
| JP | 2003129828 A | 5/2003 |

(Continued)

OTHER PUBLICATIONS

Search Report issued in corresponding Danish Application No. PA201700400 dated Apr. 17, 2018, pp. 1-7.
(Continued)

*Primary Examiner* — Anthony R Jimenez
(74) *Attorney, Agent, or Firm* — MKG, LLC (57) ABSTRACT

A reference range identifying device acquires and records, at a predetermined time interval, a measuring result of a load and exhaust temperature of an engine. The device identifies, based on combinations of the load and exhaust temperature recorded at multiple points of time, for each load zone, for example a 95% confidence interval of a distribution of exhaust temperatures as a reference range. Subsequently, the device calculates an approximate curve for lower limits and upper limits of reference ranges identified for the load zones. The device identifies a range sandwiched by the calculated two approximate curves as a reference range that changes in accordance with a load. The device, upon detecting that a current load and exhaust temperature of the engine is not included in the reference range, notifies the detected fact to a user.

9 Claims, 6 Drawing Sheets

(51) Int. Cl.
  *F02D 45/00* (2006.01)
  *B63H 21/21* (2006.01)
  *F02D 29/02* (2006.01)
  *F02D 41/22* (2006.01)
  *B63B 49/00* (2006.01)
  *B63H 21/14* (2006.01)
  *G01C 19/16* (2006.01)
  *G08B 25/01* (2006.01)

(52) U.S. Cl.
  CPC ......... *F02D 41/1495* (2013.01); *F02D 41/22* (2013.01); *F02D 45/00* (2013.01); *G06Q 50/28* (2013.01); *B63B 49/00* (2013.01); *B63H 21/14* (2013.01); *F02D 41/1497* (2013.01); *F02D 2041/227* (2013.01); *G01C 19/16* (2013.01); *G01K 2205/04* (2013.01); *G08B 25/016* (2013.01); *Y02T 10/40* (2013.01)

(58) Field of Classification Search
  CPC ... G05D 2201/0213; G05D 2201/0214; G05D 7/00; G05D 11/00; G05D 16/00; G05D 16/02; G05D 16/024; G05D 16/028; G05D 23/00; G05D 23/01; G05D 23/02; G05D 23/1902; G05D 23/1906; G05D 23/1912; G05D 23/1917; G05D 23/1919; G05D 23/1927; G05D 23/1932; G05D 23/24; B60K 15/00; B60K 13/00; B60K 13/04; F02D 1/00; F02D 2001/007; F02D 2001/0075; F02D 2001/008; F02D 9/00; F02D 41/005; B60W 2710/06; B60W 2710/0644; B60W 2710/0622; B60W 2710/0677; B60W 2710/0683; B60W 2710/0688; B60W 2710/0694; B60W 2710/1061; B60W 2710/1072; B60W 2710/1077; B60W 2900/00
  See application file for complete search history.

(56) References Cited

FOREIGN PATENT DOCUMENTS

| | | |
|---|---|---|
| JP | 2006029240 A | 2/2006 |
| JP | 2008284975 A | 11/2008 |
| JP | 2009041521 A | 2/2009 |
| JP | 2011-214471 A | 10/2011 |
| WO | 2011/125466 A1 | 10/2011 |

OTHER PUBLICATIONS

Notification of Reasons for Rejection issued in corresponding Japanese Application No. JP 2016-501905 dated Sep. 8, 2016, pp. 1-5.
International Search Report for International Application No. PCT/JP2014/084567, dated Feb. 3, 2015.
Office Action issued in corresponding Danish Patent Application No. 201700400, dated Nov. 21, 2018, 7 pages.

DEVICE, PROGRAM, RECORDING MEDIUM, AND METHOD FOR DETERMINING DEVICE NORMALITY AND ABNORMALITY INVOLVING LOADS

TECHNICAL FIELD

The present invention relates to a technique for determining whether a status of a load bearing device is normal or abnormal.

BACKGROUND

For many load bearing devices such as an engine, a pump, or a generator, a range of each of specified physical attributes such as an exhaust temperature, a scavenging pressure, or an amplitude of vibration, within which the physical attribute should be maintained, is defined by a manufacturer. The range will hereinafter be referred to as "safe operation range." For example, for many engines, as an example of a safe operation range, a lower threshold value and an upper threshold value of an exhaust temperature are defined.

A safe operation range for a load bearing device is described in, for example, patent document 1. In patent document 1, a technique is proposed in which an emission amount of exhaust of an engine is reduced by, for a predetermined time period after the engine is started, increasing a load of a generator driven by the engine and subsequently reducing an engine's intake to reduce an intake manifold pressure to a target pressure. In patent document 1, it is described that an exhaust aftertreatment device provided in an internal combustion engine to which the technique proposed in patent document 1 can be applied requires a minimal threshold temperature to work properly.

SUMMARY OF INVENTION

In a load bearing device such as an engine, a pump, or a generator, many physical attributes such as an exhaust temperature, an amplitude of vibration, a frequency of vibration, or a scavenging pressure change in accordance with a degree of a load of the device. It is of note that in the present application, a load of a device refers to a work per unit time.

For example, an exhaust temperature of an engine, generally, has a strong positive correlation with a load of the engine. If an engine that has some abnormalities is caused to continue operating under high load, an exhaust temperature will exceed an upper threshold value of a safe operation range, and consequently the engine will be subject to damage such as melting.

However, if an engine that has some abnormalities is caused to continue operating under low load, an exhaust temperature is not likely to exceed an upper threshold value of a safe operation range, because an exhaust temperature of the engine operating under low load is much lower than the upper threshold value of the safe operation range, so that even an exhaust temperature that has risen due to the abnormalities in the engine does not reach the upper threshold value of the safe operation range. Therefore, there is a risk that by causing an abnormal engine to continue operating under low load, fuel efficiency is lowered and damage other than melting occurs to the engine or a peripheral device thereof.

For example, in recent years, the number of ships traveling (or sailing, navigating) at a low speed has increased due to the rising cost of fuel. In a ship traveling at a low speed, many devices such as an engine or a generator are caused to continue operating under low load. Accordingly, in a case where such a device has some abnormalities, an attribute measured for the device falls within a safe operation range, so that it is likely that the abnormalities are not recognized by crews, and consequently fuel efficiency is lowered and the device is damaged.

In view of the foregoing, the present invention provides a means for correctly determining whether a status of a load bearing device is normal or abnormal.

To solve the foregoing problem, the present invention provides a device comprising: an acquiring means for acquiring, for each of multiple points of time, a load index indicative of a degree of a load applied to a subject device and a measuring result of an attribute index indicative of an attribute of the subject device; and an identifying means for identifying, for each of two or more loads or load zones, based on measuring results acquired by the acquiring means, a range within which an attribute index satisfies a predetermined condition, as a reference range.

In the device, the identifying means may identify, for each of the two or more loads or load zones, a confidence interval of a predetermined confidence level for an attribute index as the reference range.

In the device, the subject device may be provided in a ship, the acquiring means may acquire, for each of the multiple points of time, meteorological/hydrographic data indicative of a meteorological or hydrographic phenomenon that the ship has encountered during navigation of the ship, and the identifying means may identify the reference range, without using, from among the measuring results, measuring results that have been acquired at a time when a meteorological or hydrographic phenomenon indicated by meteorological/hydrographic data satisfies a predetermined condition.

In the device, the acquiring means may acquire, for each of the multiple points of time, data on an element of an environment in which the subject device is placed, the element affecting an attribute index of the subject device, as disturbance data indicative of a disturbance element, and the identifying means may correct an attribute index indicated by a measuring result acquired by the acquiring means, based on a disturbance element indicated by disturbance data to identify a range within which a corrected attribute index satisfies the predetermined condition, as the reference range.

In the device, the acquiring means may acquire, for each of multiple points of time, a load index indicative of a degree of a load applied to a device whose type is similar to that of the subject device and a measuring result of an attribute index indicative of an attribute of the device whose type is similar to that of the subject device, and the identifying means may identify the reference range based on measuring results acquired by the acquiring means in connection with the device whose type is similar to that of the subject device.

Also, the present invention provides a device comprising: an acquiring means for acquiring a load index indicative of a degree of a load applied to a subject device and a measuring result of an attribute index indicative of an attribute of the subject device; and a determining means for determining whether a status of the subject device is normal or abnormal based on whether an attribute index indicated by the measuring result is included in a reference range predetermined for a load or load zone according to a load index indicated by the measuring result.

In the device, the subject device may be provided in a ship, the acquiring means may acquire navigation status data indicative of a navigation status of the ship, and the determining means, upon detecting that the navigation status indicated by the navigation status data satisfies a predetermined condition, may fail to determine that the status of the subject device is abnormal, regardless of whether the attribute index is included in the reference range.

Also, the present invention provides a program that causes a computer to execute: a process of acquiring, for each of multiple points of time, a load index indicative of a degree of a load applied to a subject device and a measuring result of an attribute index indicative of an attribute of the subject device; and a process of identifying, for each of two or more loads or load zones, based on measuring results acquired in the acquiring process, a range within which an attribute index satisfies a predetermined condition, as a reference range.

Also, the present invention provides a non-transitory computer readable recording medium recording a program that causes a computer to execute: a process of acquiring, for each of multiple points of time, a load index indicative of a degree of a load applied to a subject device and a measuring result of an attribute index indicative of an attribute of the subject device; and a process of identifying, for each of two or more loads or load zones, based on measuring results acquired in the acquiring process, a range within which an attribute index satisfies a predetermined condition, as a reference range.

Also, the present invention provides a method comprising: a step of acquiring, for each of multiple points of time, a load index indicative of a degree of a load applied to a subject device and a measuring result of an attribute index indicative of an attribute of the subject device; and a step of identifying, for each of two or more loads or load zones, based on measuring results acquired in the acquiring step, a range within which an attribute index satisfies a predetermined condition, as a reference range.

Also, the present invention provides a program that causes a computer to execute: a process of acquiring a load index indicative of a degree of a load applied to a subject device and a measuring result of an attribute index indicative of an attribute of the subject device; and a process of determining whether a status of the subject device is normal or abnormal based on whether an attribute index indicated by the measuring result is included in a reference range predetermined for a load or load zone according to a load index indicated by the measuring result.

Also, the present invention provides a non-transitory computer readable recording medium recording a program that causes a computer to execute: a process of acquiring a load index indicative of a degree of a load applied to a subject device and a measuring result of an attribute index indicative of an attribute of the subject device; and a process of determining whether a status of the subject device is normal or abnormal based on whether an attribute index indicated by the measuring result is included in a reference range predetermined for a load or load zone according to a load index indicated by the measuring result.

Also, the present invention provides a method comprising: a step of acquiring a load index indicative of a degree of a load applied to a subject device and a measuring result of an attribute index indicative of an attribute of the subject device; and a step of determining whether a status of the subject device is normal or abnormal based on whether an attribute index indicated by the measuring result is included in a reference range predetermined for a load or load zone according to a load index indicated by the measuring result.

According to the present invention, a reference range of an attribute of a device, that is used to determine whether a status of the device is normal or abnormal regardless of a degree of a load of the device can be identified based on loads of the device during its operation and measuring results indicative of the attribute of the device.

DETAILED DESCRIPTION

[Embodiment]

Figure 1:
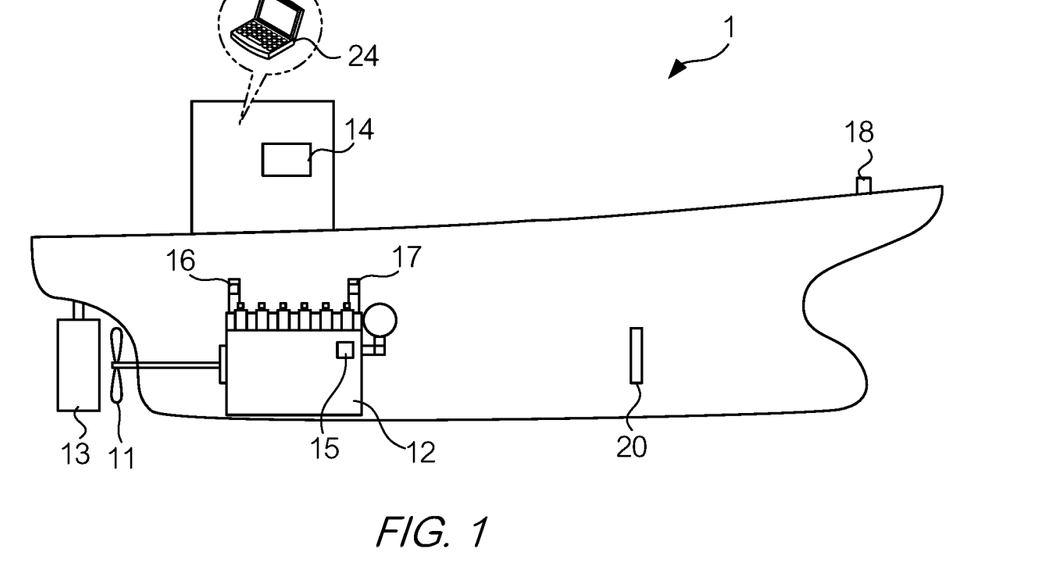
FIG. 1 is a drawing illustrating a configuration of a ship according to an embodiment.

A configuration and an operation of ship 1 according to an embodiment of the present invention will be described below. FIG. 1 is a drawing illustrating a configuration of ship 1. It is of note that in FIG. 1, components of ship 1 that are not pertinent to the present invention are omitted. Ship 1 includes, as a basic configuration, propeller 11 that propels ship 1, engine 12 that causes propeller 11 to rotate, rudder plate 13 used to change a direction of travel of ship 1, and ship navigation unit 14 used to control the ship's speed and a direction of travel of ship 1. Engine 12 is an example of a load bearing device (subject device), which drives a propulsion device. A ship navigator may, by operating ship navigation unit 14, change an output of engine 12 to adjust the ship's speed, or change an angle of rudder plate 13 to adjust a direction of travel.

In addition, ship 1 includes load identifying unit 15 that identifies a load of engine 12, which is an example of a load index, intake temperature measuring unit 16 that measures an intake temperature of engine 12, which is an example of a disturbance element, and exhaust temperature measuring unit 17 that measures an exhaust temperature of engine 12, which is an example of an attribute index. Load identifying unit 15, for example, measures a scavenging pressure of a supercharger provided in engine 12, and identifies a load of engine 12 based on the measured scavenging pressure and a predetermined calculation formula or correspondence table. It is of note that load identifying unit 15 may identify a load of engine 12 using a method other than that by reference to a scavenging pressure. For example, load identifying unit 15 may identify a load of engine 12 by using a torque applied by engine 12 to a rotating shaft of propeller 11, and a rotational speed of the propeller.

In addition, ship 1 includes wind speed measuring unit 18 that measures a wind speed, which is an example of a meteorological phenomenon or a hydrographic phenomenon, and wave height measuring unit 20 that measures a wave height, which is an example of a meteorological phenomenon or a hydrographic phenomenon.

Further, ship 1 includes reference range identifying device 24 that identifies a reference range of an exhaust temperature according to a load of engine 12, and determines based on the reference range whether a status of the engine is normal or abnormal. Reference range identifying device 24 is, for example, a general-purpose computer that executes processes in accordance with programs according to the present embodiment. The computer includes a memory such as an HDD, a processor, such as a CPU, that processes data according to programs stored in the memory, a communication interface that communicates data with another device, and a display that displays a variety of information for crews of ship 1. It is of note that the display may not be integral to the computer; instead, the computer may output image data to an external display to cause it to display information.

Figure 2:
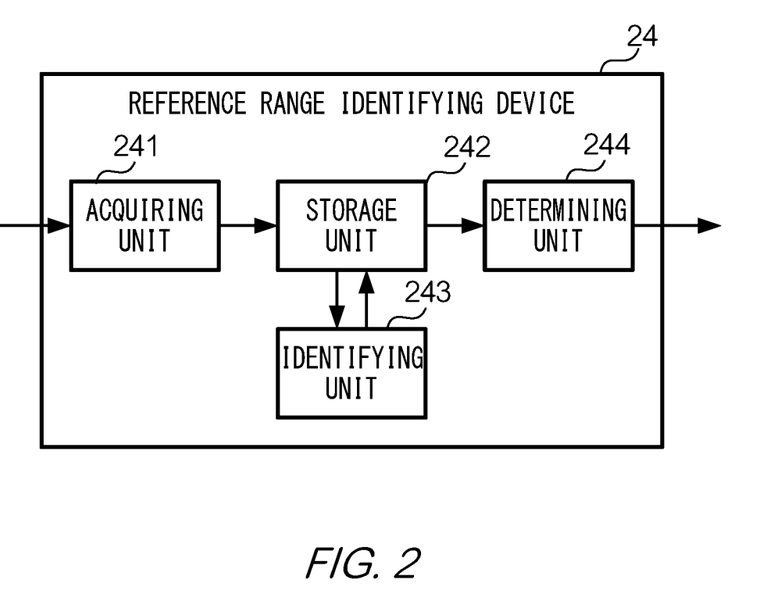
FIG. 2 is a drawing illustrating a functional configuration of a reference range identifying device according to an embodiment.

FIG. 2 is a drawing illustrating a functional configuration of reference range identifying device 24. A computer functions as reference range identifying device 24 including the components shown in FIG. 2, by executing processes according to programs according to the present embodiment. Reference range identifying device 24 includes, as a functional configuration, acquiring unit 241 that acquires different types of data such as a measured exhaust temperature of engine 12, storage unit 242 that stores different types of data acquired by acquiring unit 241, identifying unit 243 that identifies, by referring to different types of data stored in storage unit 242, a reference range of an exhaust temperature according to a load of engine 12, and determining unit 244 that determines whether a status of engine 12 is normal or abnormal based on a reference range identified by identifying unit 243. It is of note that reference range data indicative of a reference range identified by identifying unit 243 is stored in storage unit 242, and is retrieved to be used by determining unit 244.

Figure 3:
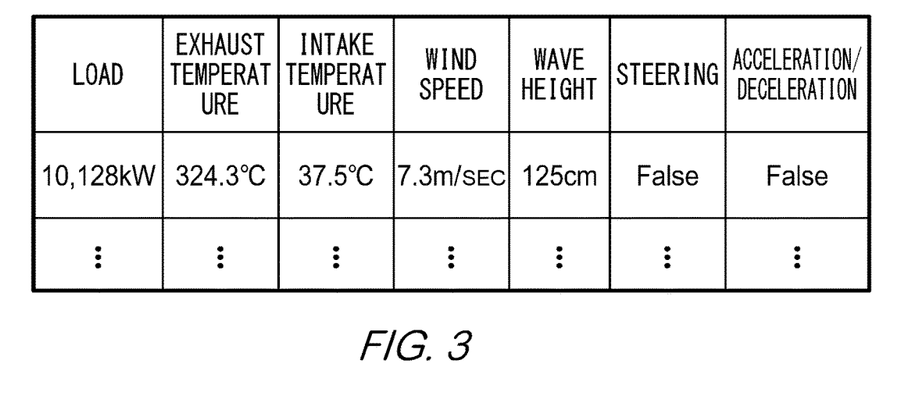
FIG. 3 is a drawing illustrating an exemplary data configuration of a log database stored in a reference range identifying device according to an embodiment.

Storage unit 242 stores a log database, in which different types of data acquired by acquiring unit 241 are accumulated. FIG. 3 is a drawing illustrating an exemplary data configuration of the log database, in which records each including different types of data acquired by acquiring unit 241 are accumulated in order of acquisition.

Acquiring unit 241 acquires, for example at a predetermined time interval, data indicative of a load of engine 12 from load identifying unit 15 to store the data in a field of [LOAD] of the log database. Acquiring unit 241 also acquires, for example at a predetermined time interval, data indicative of a measuring result from each of exhaust temperature measuring unit 17, intake temperature measuring unit 16, wind speed measuring unit 18, and wave height measuring unit 20, to store the acquired items of data in fields of [EXHAUST TEMPERATURE], [INTAKE TEMPERATURE], [WIND SPEED], and [WAVE HEIGHT] of the log database.

Acquiring unit 241 also acquires, for example at a predetermined time interval, two items of flag data, which are examples of navigation status data, output from ship navigation unit 14, one of which indicates whether steering has been performed, the other of which indicates whether the ship's speed has been changed, to store the acquired items of data in fields [STEERING] and [ACCELERATION/DECELERATION] of the log database. Ship navigation unit 14 outputs flag data "steering: True" while a ship navigator performs steering, whereas the ship navigation unit outputs flag data "steering: False" while a ship navigator does not perform steering. Ship navigation unit 14 also outputs flag data "acceleration/deceleration: True" during a time period beginning with a ship navigator's operation to accelerate or decelerate ship 1 and ending with stabilization of a ship's speed, whereas the ship navigation unit outputs flag data "acceleration/deceleration: False" during the other time period. Acquiring unit 241 acquires the items of flag data output from ship navigation unit 14 to store them in the log database.

It is of note that acquiring unit 241 may acquire different types of data directly from the units such as load identifying unit 15; alternatively, the acquiring unit may acquire the items of data from a device that manages different types of data output from the units such as load identifying unit 15. It is also of note that acquiring unit 241 may asynchronously (at different timings) acquire different types of data from the units such as load identifying unit 15. In that case, acquiring unit 241, for example, temporarily holds items of data of different types that have been sequentially acquired, and at a predetermined time interval, writes the acquired items of data (latest ones) in the log database as a record.

Figure 4:
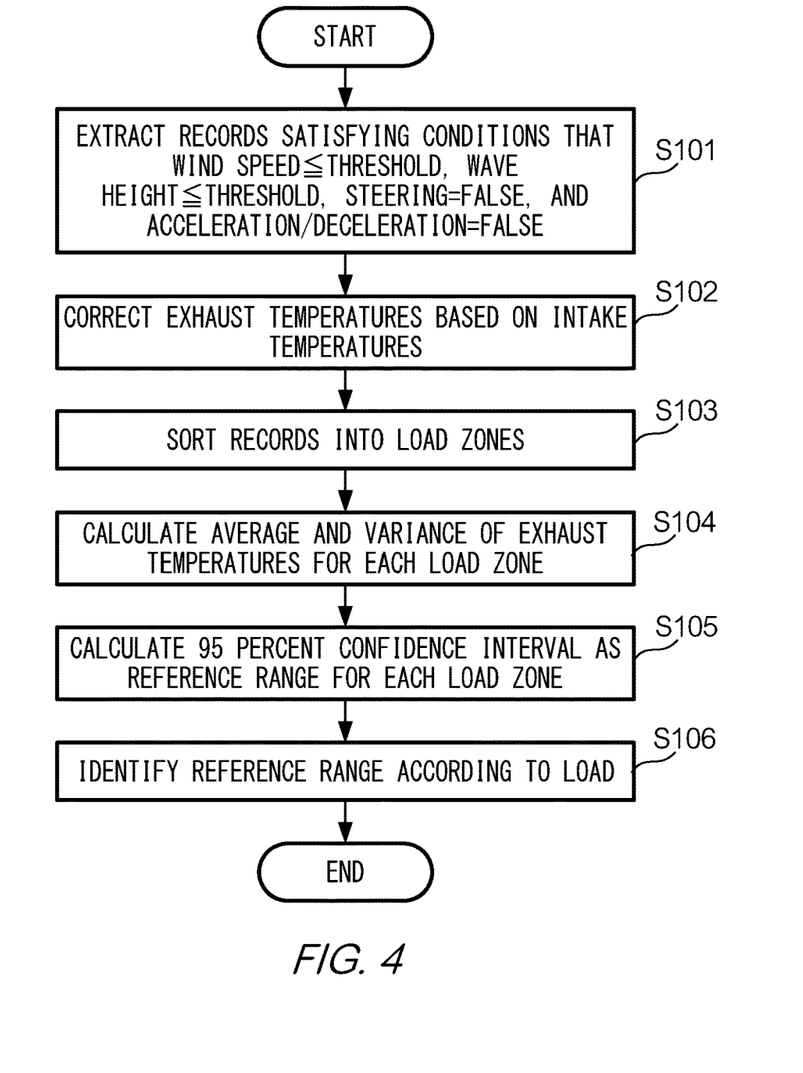
FIG. 4 is a drawing illustrating a flow of a process performed by an identifying unit of a reference range identifying device according to an embodiment.

Identifying unit 243 identifies, based on the data accumulated in the log database, a reference range of an exhaust temperature according to a load of engine 12. FIG. 4 is a drawing illustrating a flow of a process performed by identifying unit 243, which process is performed, for example, regularly.

Identifying unit 243 initially extracts records from the log database (FIG. 3), that satisfy conditions that a wind speed is lower than or equal to a predetermined threshold value, a wave height is lower than or equal to a predetermined threshold value, steering is "False," and acceleration/deceleration is "False" (S101).

Because of the extraction performed at step S101, records indicating a wind speed exceeding the predetermined threshold value, and records indicating a wave height exceeding the predetermined threshold value are not used for identification of a reference range described below, because in a situation where a wind speed exceeds the predetermined threshold value or a wave height exceeds the predetermined threshold value (in other words, in heavy weather), a load of the main engine violently fluctuates due to problems such as propeller racing. When a load of the main engine violently fluctuates, an exhaust temperature does not change in accordance with a load of engine 12; accordingly, it is difficult to determine whether engine 12 is operating normally or abnormally based on a relationship between an exhaust temperature and a load.

Also, because of the extraction performed at step S101, records indicating that steering is "True," and records indicating that acceleration/deceleration is "True" are not used for identification of a reference range described below, because in the process of steering or change in speed, a relationship between a load and an exhaust temperature of engine 12 is different from that observed in a normal navigation status.

Subsequently, identifying unit 243, for each of the records extracted at step S101, corrects an exhaust temperature based on an intake temperature (S102). In the correction performed at step S102, identifying unit 243, using a correspondence table or function formula representing a relationship between an exhaust temperature and an intake temperature of engine 12 under a normal condition, corrects an exhaust temperature accumulated in the log database to an exhaust temperature that is estimated when an intake temperature is equal to a reference temperature such as 30 degrees Celsius.

Subsequently, identifying unit 243 sorts the records that have been extracted at step S101 and have been subjected to correction of an exhaust temperature at step S102, into load zones (S103). In the present application, load zones refer to a predetermined number of partial load ranges constituting a range from a lower limit to an upper limit of a load of engine 12. In the following description, identifying unit 243 sorts the records of the log database into eight load zones A to H; however, the number of load zones is not limited to eight.

Subsequently, identifying unit 243, for each of load zones A to H, calculates an average and a variance of exhaust temperatures, which have been corrected at step S102, indicated by records belonging to a load zone (S104). Subsequently, identifying unit 243, for each of load zones A to H, calculates, for example, a 95 percent confidence interval of a distribution of exhaust temperatures, which conforms to a normal distribution calculated using an average and variation calculated at step S104 (S105). It is of note that the confidence level of the confidence intervals calculated by identifying unit 243 at step S105 is not limited to 95 percent; for example, the confidence level may be another predetermined value such as 90 percent.

Figure 5:
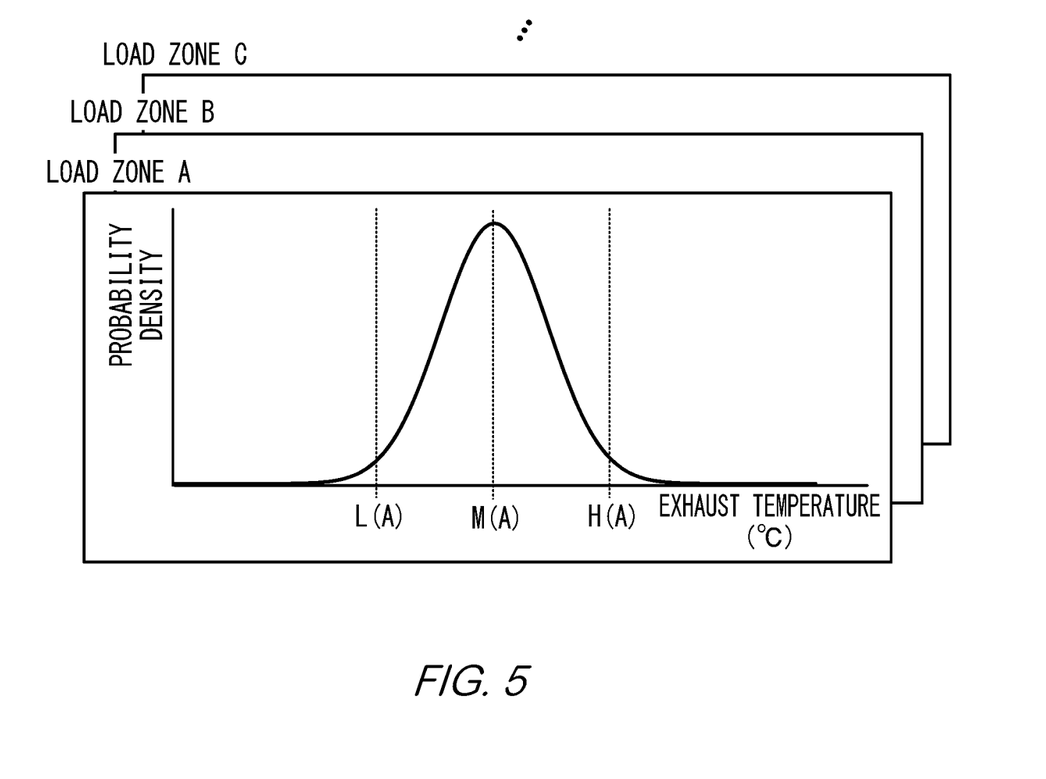
FIG. 5 is a drawing illustrating a confidence interval calculated by an identifying unit of a reference range identifying device according to an embodiment.

FIG. 5 is a drawing illustrating a confidence interval calculated at step S105. In FIG. 5, the front graph shows a distribution, which is assumed to be normally distributed, of (corrected) exhaust temperatures indicated by records belonging to load zone A. In the graph, variable M(A) refers to an average, variable L(A) refers to a lower limit of a 95 percent confidence interval, and variable H(A) refers to an upper limit of the 95 percent confidence interval. Character (A) indicates that variables M, L, and H are values relevant to load zone A; accordingly, for example, an average for load zone B is M(B), and a lower limit and an upper limit of a 95 percent confidence interval for load zone B are L(B) and H(B).

Figure 6:
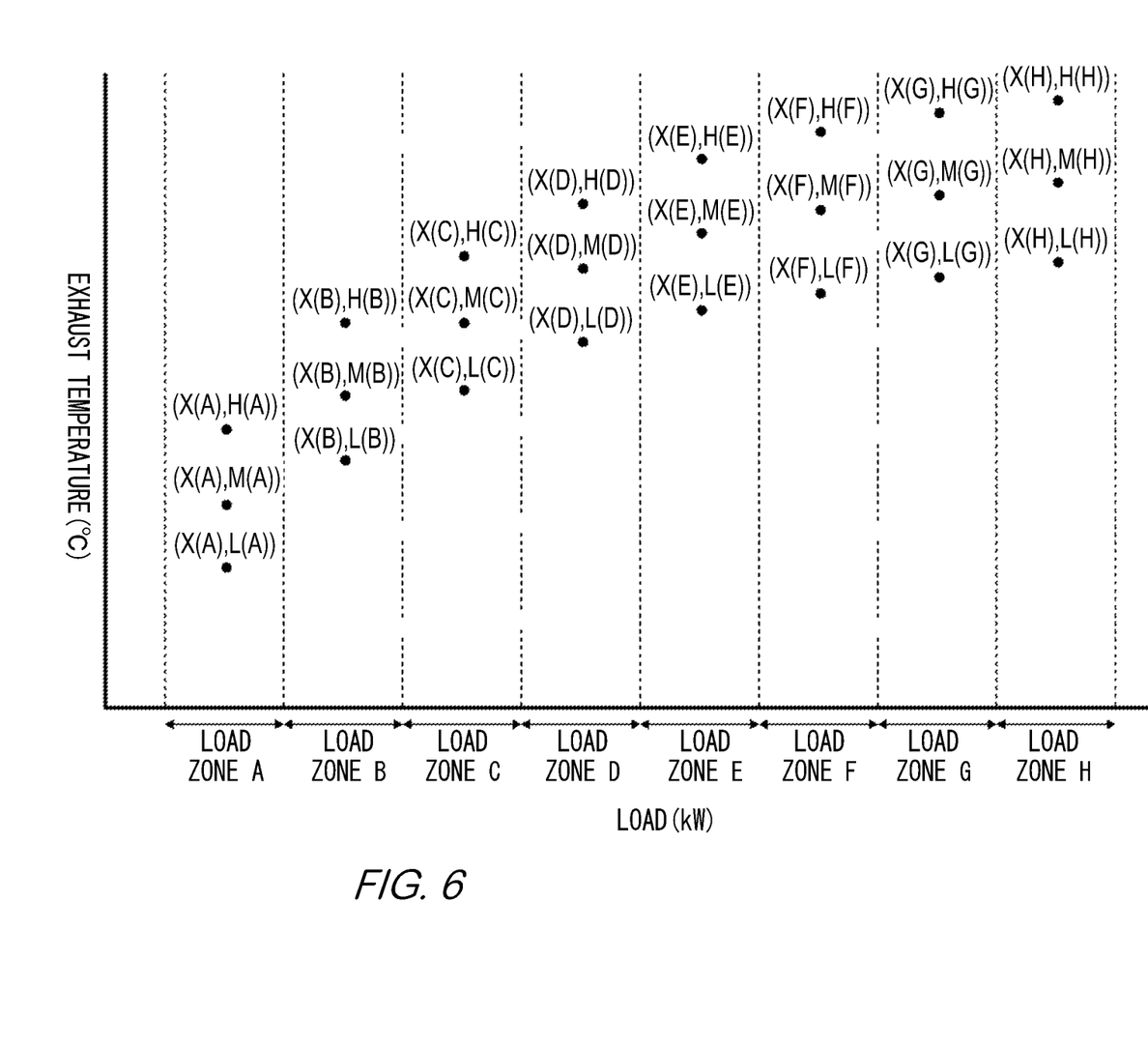
FIG. 6 is a drawing illustrating a process performed by an identifying unit of a reference range identifying device according to an embodiment.
Figure 7:
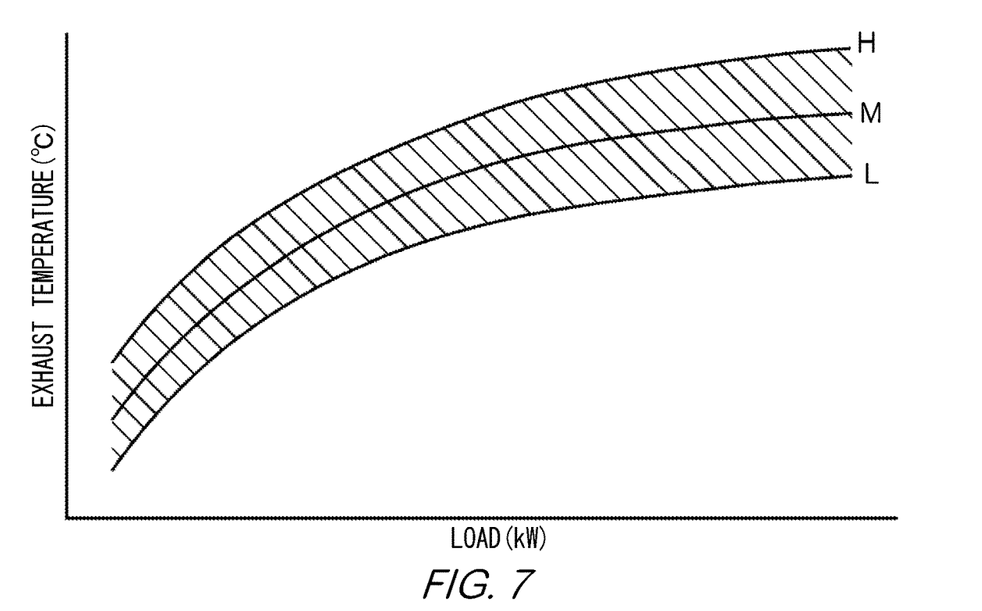
FIG. 7 is a drawing illustrating a process performed by an identifying unit of a reference range identifying device according to an embodiment.

Subsequently, identifying unit 243 identifies a reference range of an exhaust temperature according to a load of engine 12 (S106). In the present application, a term "a reference range according to a load" refers to a reference range that changes in accordance with a change in load. FIGS. 6 and 7 are drawings illustrating a process performed by identifying unit 243 at step S106. FIG. 6 shows a graph in which lower limits of 95 percent confidence intervals, averages, upper limits of the 95 percent confidence intervals for the load zones that have been calculated at step S105 are plotted. In FIG. 6, variables X(A) to X(H) in the horizontal axis refer to medians for load zones A to H. At step S106, identifying unit 243 calculates an approximate curve for lower limits of 95 percent confidence intervals; specifically, identifying unit 243 calculates an approximate curve through coordinates (X(A), L(A)), (X(B), L(B)), ..., (X(H), L(H)). When identifying unit 243 calculates an approximate curve, it is preferable to select a most suitable type of curve from among types such as polynomial approximation or log approximation.

Identifying unit 243 calculates an approximate curve for each set of averages and upper limits of 95 percent confidence intervals, as in the case of lower limits of 95 percent confidence intervals. FIG. 7 shows approximate curves identified by identifying unit 243 at step S106. In FIG. 7, curves L, M, and H refer to approximate curves for lower limits of 95 percent confidence intervals, averages, and upper limits of 95 percent confidence intervals, respectively. Identifying unit 243 identifies a range sandwiched by curve L and curve H, which is the shaded range in FIG. 7, as a reference range of an exhaust temperature according to a load of engine 12. Identifying unit 243, for example, stores data on function formulas representing curve L, curve M, and curve H in storage unit 242, as reference range data on the reference range.

Identifying unit 243, for example, regularly performs a process according to the above flow to update reference range data stored in storage unit 242. Reference range data does not change significantly in a short term; reference range data changes slowly due to a cause such as deterioration over time of engine 12 or a peripheral device thereof. Accordingly, it is preferable to update reference range data, for example, every one or a few months. After engine 12 or a peripheral device thereof undergoes maintenance work, a distribution of an exhaust temperature according to a load of engine 12 may change; accordingly, for example, at step S104 where an average and a variance are calculated, identifying unit 243 may perform a correction process of weighing an exhaust temperature (corrected value) measured after maintenance work over an exhaust temperature (corrected value) measured prior to the maintenance work. The foregoing is a description of a process performed by identifying unit 243.

Figure 8:
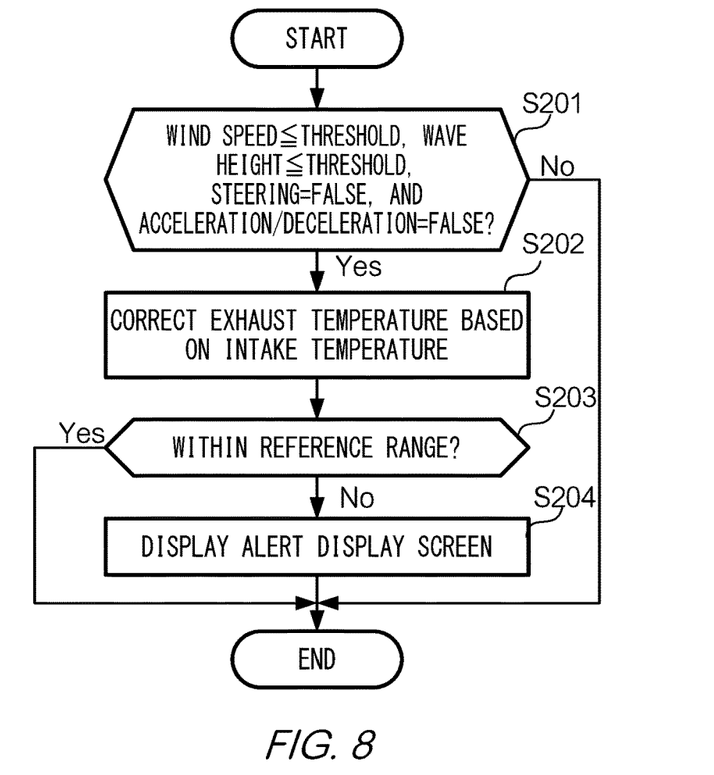
FIG. 8 is a drawing illustrating a flow of a process performed by a determining unit of a reference range identifying device according to an embodiment.

Now, a process performed by determining unit 244 will be described. FIG. 8 is a drawing illustrating a flow of a process performed by determining unit 244. Determining unit 244 performs a process according to the flow shown in FIG. 8 each time a new record is added to the log database.

Determining unit 244 initially determines whether a record that has been newly added to the log database, which record will hereinafter be referred to as "latest record," satisfies conditions that a wind speed is lower than or equal to a predetermined threshold value, a wave height is lower than or equal to a predetermined threshold value, steering is "False," and acceleration/deceleration is "False" (S201). When a wind speed exceeds a predetermined threshold value, a wave height exceeds a predetermined threshold value, steering is "True," or acceleration/deceleration is "True" (S201; "No"), determining unit 244 concludes the process.

When a wind speed is lower than or equal to a predetermined threshold value, a wave height is lower than or equal to a predetermined threshold value, steering is "False," and acceleration/deceleration is "False" (S201; "Yes"), determining unit 244 corrects an exhaust temperature indicated by the latest record based on an intake temperature indicated by the same record (S202). The correction made at step S202 by determining unit 244 is a processing similar to the correction made at step S102 by identifying unit 243.

Figure 9:
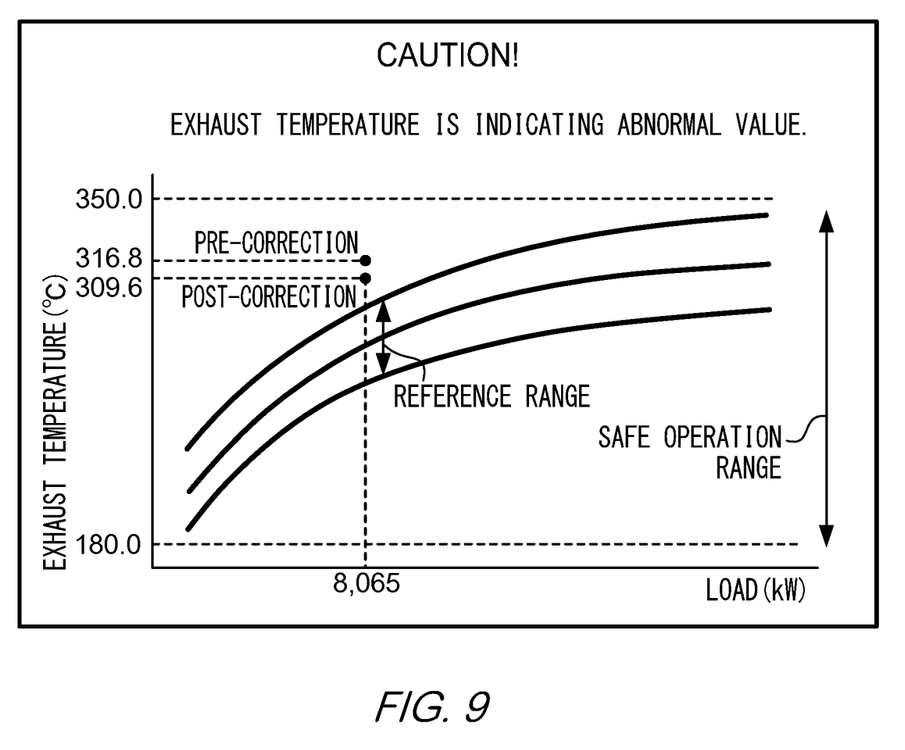
FIG. 9 is a drawing illustrating an exemplary screen displayed by a determining unit of a reference range identifying device according to an embodiment.

Subsequently, determining unit 244 determines whether a load indicated by the latest record and the (corrected) exhaust temperature are included in a reference range represented by reference range data (S203). When a load indicated by the latest record and the (corrected) exhaust temperature are included in a reference range (S203; "Yes"), determining unit 244 concludes the process. When a load indicated by the latest record and the (corrected) exhaust temperature are not included in a reference range (S203; "No"), determining unit 244 displays an alert to crews of ship 1 (S204). FIG. 9 is a drawing illustrating an exemplary screen showing an alert displayed by determining unit 244, which screen will hereinafter be referred to as "alert display screen." In the alert display screen, a graph is shown, in which on top of a reference range and an average of exhaust temperatures, a load indicated by the latest record and the (non-corrected and corrected) exhaust temperatures are plotted. In the alert display screen, a safe operation range is also shown. The foregoing is a description of a process performed by determining unit 244.

By viewing the alert display screen, a crew is able to know that it is highly likely that engine 12 has had some abnormalities. In the case of the example shown in FIG. 9, the exhaust temperature of engine 12 falls within the safe operation range; accordingly, a crew, conventionally, has not recognized an abnormality of the engine. In ship 1 according to the present embodiment, where a reference range of an exhaust temperature according to a load is referenced, whether a status of engine 12 is normal or abnormal is correctly determined.

It is of note that reference range identifying device 24, in addition to an alert display screen displayed by determining unit 244, may make a notification, for example, by generating an alarm sound. It is also of note that reference range identifying device 24 may send data that requests that an alert display screen be displayed to, for example, terminal devices carried by crews. The crews, by viewing the alert display screen displayed on his/her terminal device, is able promptly to know about an abnormality of engine 12.

[Modifications]

The above embodiment may be subject to various modifications within a technical idea of the present invention. Exemplary modifications are described below. It is of note that the above embodiment and two or more of the exemplary modifications described below may be combined with each other.

(1) In the above embodiment, identifying unit 243 calculates a confidence interval based on an assumption that a distribution of exhaust temperatures conforms to a normal distribution; instead of the calculation method, identifying unit 243 may calculate a confidence interval based on an assumption that a distribution of exhaust temperatures conforms to a type of a distribution other than a normal distribution. In the above embodiment, identifying unit 243 identifies a confidence interval of a given confidence level as a reference range; however, a reference range is not limited to a confidence interval of a given confidence level. Identifying unit 243 may identify any interval within which exhaust temperatures acquired from the log database satisfy a predetermined condition, as a reference range. For example, identifying unit 243 may identify a range in which samples of exhaust temperatures other than those belonging to the top 2.5 percent or the bottom 2.5 percent are included, as a reference range. Namely, identifying unit 243 may identify a reference range in accordance with another rule.

(2) In the above embodiment, reference range identifying device 24 is provided in ship 1; however, reference range identifying device 24 may be provided in a place other than ship 1, such as on land. In that case, reference range identifying device 24 includes a communication unit that communicates with a communication device provided on ship 1, by use of which unit the reference range identifying device receives, for example via a communication satellite, load indices and attribute indices such as exhaust temperatures, which are sent from the communication device of the ship, to identify a reference range and determine whether a status of engine 12 is normal or abnormal, and the reference range identifying device sends reference range data and data that requests that an alert display screen be displayed to the communication device of the ship. When doing so, reference range identifying device 24 may receive not only data sent from ship 1, but also a similar type of data from another ship whose type is similar to that of ship 1 to generate reference range data.

(3) In the above embodiment, reference range identifying device 24 generates reference range data concerning a subject device such as engine 12 of ship 1 based on data on load indices and attribute indices, such as exhaust temperatures, of the ship; however, reference range identifying device 24 may generate reference range data concerning a subject device of ship 1 based on data on load indices and attribute indices concerning a subject device of another ship whose type is similar to that of ship 1. For example, reference range identifying device 24 provided in ship 1 sends data on load indices and attribute indices concerning a subject device of the ship to a server device provided on land via a communication satellite. In addition, reference range identifying device 24 receives, from the server device, data on load indices and attribute indices concerning a subject device of a ship whose type is similar to that of ship 1. Reference range identifying device 24 generates reference range data concerning the subject device of ship 1 based on not only the data on load indices and attribute indices concerning the subject device of the ship, but also on the data received from the server device, on load indices and attribute indices concerning the subject device of the other ship.

(4) In the above embodiment, a load identified by load identifying unit 15, which directly indicates a load, is used as a load index indicative of a degree of a load applied to engine 12; instead of the load, a load index indirectly indicating a degree of a load may be used. The load index may, for example, include fuel consumption per unit time and an amount of exhaust gas per unit time.

(5) In the above embodiment, it is determined whether a status of engine 12 is normal or abnormal; however, a device whose status is determined based on a reference range identified using the present invention is not limited to engine 12. Any load bearing device such as a pump or a generator may be selected as a subject device. In the above embodiment, an exhaust temperature is selected as an attribute index based on which whether a status of engine 12 is normal or abnormal is determined; however, in the present invention, an attribute index that can be used to determine whether a status of a device is normal or abnormal is not limited to an exhaust temperature. Any measurable attribute index indicative of an attribute of a device may be employed. For example, a variety of types of attribute indices such as an amplitude of vibration, a frequency of vibration, a degree of noise, a pitch of noise, a temperature of a predetermined part of a main body, a pressure applied to a predetermined part of a main body, and a torque of a driving unit may be employed to determine whether a status of a device is normal or abnormal.

(6) In the above embodiment, data on a wind speed and a wave height is employed as meteorological/hydrographic data indicative of a meteorological or hydrographic phenomenon that ship 1 has encountered during its navigation; instead of or in addition to the data, data indicative of another type of a meteorological or hydrographic phenomenon may be used. For example, meteorological/hydrographic data indicative of a wind direction, a wave direction, a tidal current speed, or a current direction may be used. In the above embodiment, an intake temperature is used as a disturbance element, which is an environmental element that affects an attribute of engine 12; instead of or in addition to the disturbance element, data on another type of a disturbance element may be used. For example, data on a type of oil used in engine 12 may be used as data indicative of a disturbance element.

(7) In the above embodiment, engine 12, which is an example of a load bearing device (or a device that operates under load), is assumed to be provided in ship 1; however, a device whose status is determined is not limited to a device provided in ship 1. For example, such a determination may be made for a device provided in a movable body other than a ship, or a device provided in a plant.

(8) In the above embodiment, reference range identifying device 24 is a computer that executes processes in accordance with programs; however, reference range identifying device 24 may be a dedicated device consisting of hardware circuitry.

(9) The flows of a process according to the above embodiment are concrete examples shown for the purpose of illustration; another flow in which steps are differently ordered that achieves a similar result or an alternative process that achieves a similar result may be employed. The data and values provided in connection with the above embodiment are concrete examples shown for the purpose of illustration; they are not intended to limit the present invention.

(10) In the above embodiment, a reference range refers to a normal range of an attribute of a subject device to which a load is applied, such as engine 12; however, a reference range that is a range of an attribute, based on which whether a status of a subject device is normal or abnormal can be determined, may not refer to a normal range. For example, an abnormal range of an attribute of a subject device may be used as a reference range.

(11) In the above embodiment, reference range data is generated without consideration for deterioration over time of a subject device; instead of this, reference range data may be generated in consideration of an effect of deterioration over time of a subject device. For example, identifying unit 243 of reference range identifying device 24 identifies an index indicative of deterioration over time of a subject device, which index will hereinafter be referred to as "aging deterioration index," to store data on the identified aging deterioration index in storage unit 242 in association with data on a load index and an attribute index. The aging deterioration index may include, for example, a time or operation time that has elapsed after the subject device is produced, or a value obtained by multiplying the operation time by a coefficient according to a degree of a load. Identifying unit 243, to identify a reference range, sorts load indices and attribute indices into groups based on degrees of aging deterioration indices. Identifying unit 243, for each of the groups, generates reference range data, so that reference range data is generated for each range of the aging deterioration index. Determining unit 244, to determine whether a status of the subject device is normal or abnormal, uses reference range data according to an aging deterioration index matching a current status of the subject device.

(12) In the above embodiment, a condition to be met by an attribute index that is used by identifying unit 243 of reference range identifying device 24 to identify a reference range may be changed. For example, as a confidence interval to be identified as a reference range, an interval consisting of a combination of an upper side confidence interval and a lower side confidence interval, which are different in a confidence level from each other, may be identified. For each load zone, a confidence interval of a different confidence level may be identified. A result of a user's determination as to whether a status of a subject device is normal or abnormal may be accumulated together with a load index and an attribute index that are measured as of the determination, so that for each load zone, a range in which attribute indices, for which a determination as being normal has been made, are distributed may be identified as a reference range. A reference range identified by identifying unit 243 in accordance with predetermined conditions may be subject to a correction based on a user's experience before the reference range is used by determining unit 244. Instead of a reference range identified by identifying unit 243, for example, a reference range input by a user may be used by determining unit 244 to determine whether a status of a subject device is normal or abnormal.

It is of note that the present invention may be implemented as a device as exemplified by reference range identifying device 24, a program that enables a computer to function as the device, a non-transitory computer readable medium capable of recording the program, or a method of process performed by the device.

DESCRIPTION OF REFERENCE NUMERALS

1 . . . ship, 11 . . . propeller, 12 . . . engine, 13 . . . rudder plate, 14 . . . ship navigation unit, 15 . . . load identifying unit, 16 . . . intake temperature measuring unit, 17 . . . exhaust temperature measuring unit, 18 . . . wind speed measuring unit, 20 . . . wave height measuring unit, 24 . . . reference range identifying device, 241 . . . acquiring unit, 242 . . . storage unit, 243 . . . identifying unit, 244 . . . determining unit

What is claimed is:

1. A device comprising:
a processor; and
a memory;
the processor configured to:
    acquire, by an acquiring unit, for each of multiple points of time during normal operation of the device, a measuring result of a load index indicative of a degree of a load applied to a subject device and a measuring result of an attribute index indicative of an attribute of the subject device; and
    identify, by an identifying unit, for each of two or more of loads or load zones, based on pairs of the measured load index result and the measured attribute index result acquired by the acquiring means unit that satisfy an operating condition of the subject device, a reference range within which the attribute index satisfies a predetermined condition, a width of the reference range changing in accordance with the two or more of loads or load zones.

2. The device according to claim 1, wherein the predetermined condition is based on a confidence interval of a predetermined confidence level for the attribute index of each of the two or more loads or load zones.

3. The device according to claim 1, wherein:
the subject device is provided in a ship; and
the processor is further configured to:
    acquire, by the acquiring unit, for each of the multiple points of time, meteorological/hydrographic data indicative of a meteorological or hydrographic phenomenon that the ship has encountered during navigation of the ship; and
    identify, by the identifying unit, the reference range, without using, from among the measuring results, measuring results that have been acquired at a time when a meteorological or hydrographic phenomenon indicated by meteorological/hydrographic data satisfies the normal operating condition of the ship.

4. The device according to claim 1, wherein the processor is further configured to:
   acquire, by the acquiring unit, for each of the multiple points of time, data on an element of an environment in which the subject device is placed, the element affecting an attribute index of the subject device, as disturbance data indicative of a disturbance element; and
   correct, by the identifying unit, an attribute index indicated by a measuring result acquired by the acquiring unit, based on a disturbance element indicated by disturbance data to identify a range within which a corrected attribute index satisfies the predetermined condition, as the reference range.

5. The device according to claim 1, wherein the processor is further configured to:
   acquire, by the acquiring unit, for each of multiple points of time, a load index indicative of a degree of a load applied to a second device and a measuring result of an attribute index indicative of an attribute of the second device; and
   identify, by the identifying unit, the reference range based on measuring results acquired by the acquiring unit in connection with the second device.

6. The device according to claim 1, wherein the processor is further configured to:
   update, by the identifying unit, the reference ranges.

7. The device according to claim 1, wherein the processor is further configured to:
   identify, by the identifying unit, an index indicative of deterioration over time of the subject device, and identifies, for each of a range of the adding deterioration index, the reference range based on the identified indexes and the pairs of the measured load index and the measured attribute index.

8. The device according to claim 1, wherein the processor is further configured to:
   determine, by a determining unit, whether a status of the subject device is normal or abnormal based on whether an attribute index indicated by the acquired measuring result that satisfies the operating condition of the subject device is included in the identified reference range for a load or load zone according to a load index indicated by the acquired measuring result.

9. The device according to claim 8, wherein:
   the subject device is provided in a ship, wherein the normal operating condition of the ship includes the navigation status of the ship; and
   the processor is further configured to:
      acquire, by the acquiring unit, navigation status data indicative of the navigation status of the ship; and
      fail to determine, by the determining unit, upon detecting that the navigation status indicated by the navigation status data fails to satisfy the operating condition of the ship, that the status of the subject device is abnormal, regardless of whether the attribute index is included in the reference range.

* * * * *